(No Model.)
C. A. TATUM.
BOTTLE STOPPER AND FAUCET.
No. 404,122. Patented May 28, 1889.
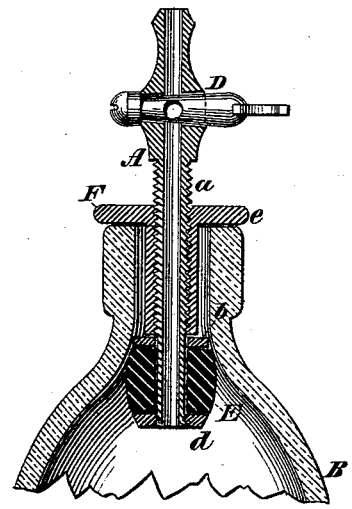
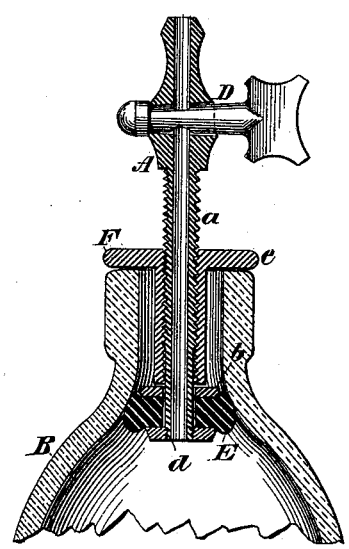
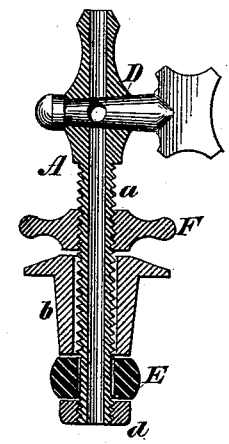
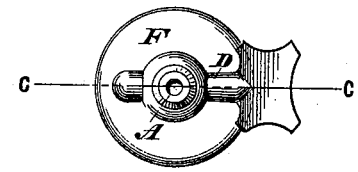
WITNESSES:
Gustave Dieterich
T. F. Bourne.
INVENTOR
Chas. A. Tatum
BY Briesen & Steele
ATTORNEYS.

UNITED STATES PATENT OFFICE.

CHARLES A. TATUM, OF NEW YORK, N. Y., ASSIGNOR TO WHITALL, TATUM & CO., OF SAME PLACE.

BOLTLE-STOPPER AND FAUCET.

SPECIFICATION forming part of Letters Patent No. 404,122, dated May 28, 1889.

Application filed March 6, 1888. Serial No. 266,330. (No model.)

*To all whom it may concern:*

Be it known that I, CHARLES A. TATUM, a resident of the city, county, and State of New York, have invented an Improved Combined Bottle-Stopper and Faucet, of which the following is a specification.

The object of my invention is to produce a bottle-stopper which will also serve to discharge liquid from a bottle while the stopper is in position.

The invention consists in the peculiar construction and combination of devices hereinafter described and claimed.

Reference is to be had to the accompanying drawings, forming part of this specification, in which—

Figures 1 and 2 are cross-sections on the line *c c*, Fig. 3, of my improved bottle-stopper, showing it in different positions in a bottle. Fig. 3 is a top view of the same, and Fig. 4 is a vertical cross-section of a modification.

The letter A in the accompanying drawings represents a tube of suitable size that is threaded throughout a portion of its length, as at *a*. Near its upper end this tube is provided with a cock or plug, D, as shown. Near the inner or lower end the tube A carries an expansible ring, E, of rubber or analogous material. This expansible ring E is held between a movable nut, F, and a shoulder or support, *d*, that projects from the lower end of the tube A. The nut F can be screwed up and down on the threaded tube A, and is provided at the upper end with a flange-like head or handle, *e*. Between the nut F and the rubber ring E is interposed a washer, *b*, which may be flat, as in Fig. 1, or tubular, as in Fig. 4.

To use my invention, I insert the tube A while the rubber E is expanded lengthwise, as in Fig. 1, into the neck of the bottle B. The handle part of the nut F is of such size that it cannot enter the mouth of the bottle. I now turn the nut F so as to compress the rubber ring E longitudinally, causing it to expand laterally, as in Fig. 2, until it meets the inner walls of the bottle, thereby closing the same.

The contents of the bottle may be readily withdrawn to the required extent by merely turning the cock D without the necessity of removing the stopper.

Having now described my invention, what I claim is—

The bottle-stopper and faucet, comprising the nut F, adapted to fit in the neck of the bottle and having the flange *e* at its upper end, the cock D, having the threaded tube A extending through the nut and having its lower end reduced in diameter and extending below the nut and provided with the shoulder *d*, the elastic ring or stopper E, fitting on the reduced end of the tube and bearing on the shoulder *d*, and the washer *b*, loose on said reduced end of the tube and bearing on the upper side of the ring or stopper, substantially as described.

C. A. TATUM.

Witnesses:
 HARRY M. TURK,
 GUSTAV SCHNEPPÉ.